United States Patent
Paulson et al.

(10) Patent No.: US 7,330,106 B2
(45) Date of Patent: Feb. 12, 2008

(54) SEVERE AND CONTROLLED BRAKING ALERT SIGNALING APPARATUS FOR VEHICLES

(76) Inventors: Cindy L. Paulson, 2402 N. Long Lake Rd., Fenton, MI (US) 48430; Carl D. Peterson, 11479 Fenton Rd., Fenton, MI (US) 48430

( * ) Notice: Subject to any disclaimer, the term of this patent is extended or adjusted under 35 U.S.C. 154(b) by 253 days.

(21) Appl. No.: 11/116,080

(22) Filed: Apr. 27, 2005

(65) Prior Publication Data

US 2005/0237175 A1 Oct. 27, 2005

Related U.S. Application Data

(60) Provisional application No. 60/565,762, filed on Apr. 27, 2004.

(51) Int. Cl.
*B60Q 1/50* (2006.01)

(52) U.S. Cl. ............ 340/467; 340/464; 340/468; 340/479; 340/439; 362/487; 362/496

(58) Field of Classification Search .......... 340/467, 340/468, 464, 479, 438, 439, 901, 903; 362/487, 362/496, 541; 180/167, 168, 271
See application file for complete search history.

(56) References Cited

U.S. PATENT DOCUMENTS

| | | | | |
|---|---|---|---|---|
| 5,821,851 A | * | 10/1998 | Blackmer | 340/467 |
| 6,121,896 A | * | 9/2000 | Rahman | 340/902 |
| 6,130,609 A | * | 10/2000 | Huang | 340/467 |

* cited by examiner

*Primary Examiner*—Hung Nguyen
(74) *Attorney, Agent, or Firm*—The Weintraub Group, PLC

(57) ABSTRACT

An inertia controlled deceleration signal apparatus for use in a leading automobile vehicle, which apparatus is in addition to the standard brake signal light and transmits a warning light to a following automobile vehicle upon braking, and operates to initiate a warning light, which warning light is either on or off wherein to indicate a severe or panic braking operation or of increasing light intensity wherein to indicate a controlled braking operation.

19 Claims, 3 Drawing Sheets

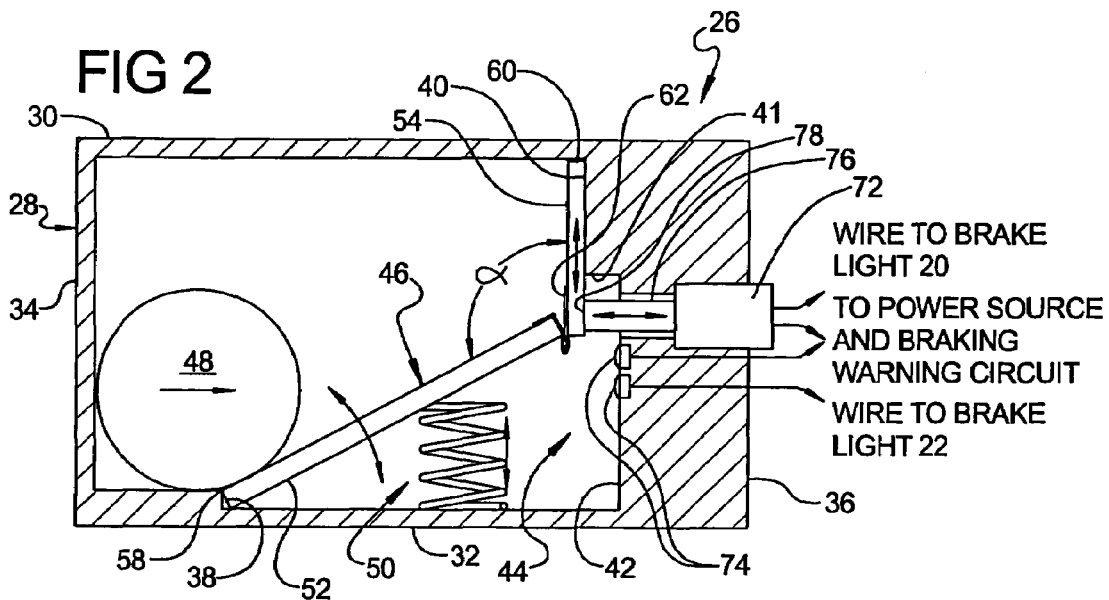
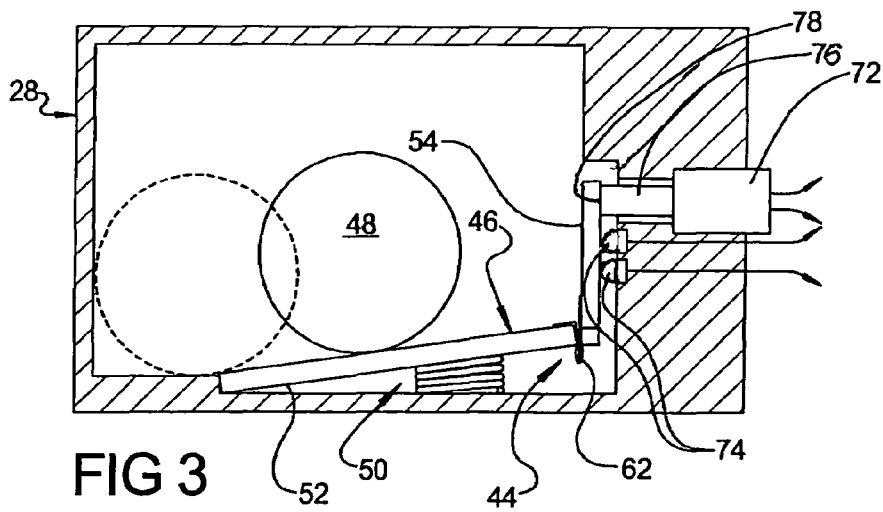

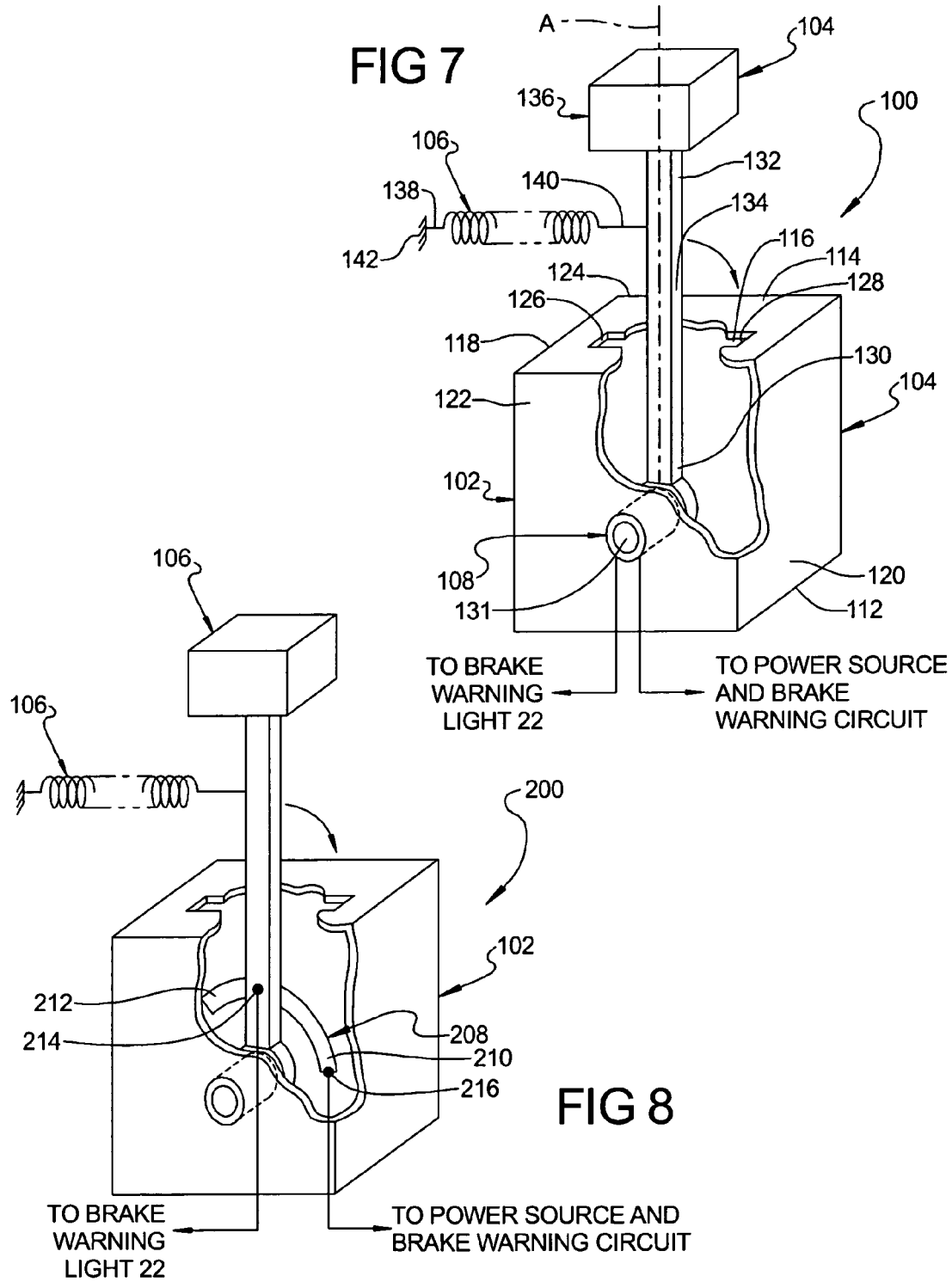

SEVERE AND CONTROLLED BRAKING ALERT SIGNALING APPARATUS FOR VEHICLES

CROSS-REFERENCE TO RELATED APPLICATIONS

This application is a continuation in part of now abandoned Patent Application Ser. No. 60/565,762, filed Apr. 27, 2004, the entire disclosure of which is hereby incorporated by reference.

BACKGROUND OF THE INVENTION

1. Field of the Invention

This invention relates to inertia controlled deceleration signal apparatus for use in a leading automobile vehicle, which apparatus transmits a warning light to a following automobile vehicle upon braking, and more particularly, to signal apparatus which is in addition to the standard brake signal light and operates to initiate a warning light, which warning light is either on or off wherein to indicate a severe or panic braking operation or of increasing light intensity wherein to indicate a controlled braking operation.

2. Description of Related Art

The use of brake light systems to indicate intensity of slow down of a vehicle is known. That is, all vehicles on the roads today include a brake light to signal that the vehicle is stopping, which light is actuated when the driver places their foot to the brake pedal. However, both the initiation of the light and the intensity of the light are the same for all rates of deceleration. This can be misleading because the driver behind has no way of knowing if the driver ahead is "riding the brake" or is in fact making an abrupt or panic stop.

Extreme braking light systems and increased light illumination systems for use in vehicles is known. Illustrative illumination systems, arrangements, and apparatus for indicating a braking operation are disclosed in U.S. Pat. No. 3,332,060 to Liljequist; U.S. Pat. No. 4,107,647 to Yoshino; U.S. Pat. No. 5,059,947 to Chen; U.S. Pat. No. 5,089,805 to Salsman; U.S. Pat. No. 5,231,373 to Freeman et al.; U.S. Pat. No. 5,821,851 to Blackmer; U.S. Pat. No. 5,831,521 to Huang; U.S. Pat. No. 5,842,774 to Sur; U.S. Pat. No. 6,417,767 and division United States Patent Publication US 2003/0122663 A1. to Carlson et al.; and U.S. Pat. No. 6,424,256 to Ryder.

In U.S. Pat. No. 3,332,060 to Liljequist, an inertia actuated switching device is connected between the brake light electrical system and the hydraulic brake system of a vehicle. The switching device includes an axial track of electrically resistive material and an inertia actuated mass of electrically conductive material supported for axial movement on the track. Deceleration of the vehicle by the brake pedal causes the mass to move axially over the track, changing the resistance in the electrical circuit of the brake lights and the intensity of the rear brake lights. Liljequist teaches against the use of a rheostat in the brake light system of a vehicle.

U.S. Pat. No. 5,089,805 to Salsman and U.S. Pat. No. 5,821,851 to Blackmer disclose pendulum actuated vehicle deceleration sensing devices, each including a pendulum arm, and switches that are actuated upon rotation of the pendulum.

In Salsman, a plurality of mercury switches are in spaced relation between the ends of the arm, each switch being at a small angle to a true horizontal, and an electromagnet is provided to lock the arm in true vertical upon application of the brake pedal. Application of the vehicle brake will lock the arm in true vertical and force the mercury to move horizontally. Depending on the angle of any given switch, inertia will force the mercury into electrical circuit relation with an associated warning light.

In Blackmer, the pendulum is fixedly connected to a shaft and deceleration of the vehicle causes the pendulum and shaft to rotate and a contact arm affixed to the shaft to rotate into electrical connection with a succession of electrical contacts.

U.S. Pat. No. 5,831,521 to Huang discloses an automatic emergency signal device for a vehicle, which device mounts a movable weight ball, a sensor, and a pivoted restoring lever in a casing. A free end of the restoring lever normally urges the ball into a rest position and, upon a sudden braking, is pivoted by the ball into operable relation with the sensor, wherein to turn the warning lights on, and thereafter, to urge the ball back into the rest position, and turn the warning light off.

However, if the vehicle is descending a steep hill, inertial forces on the ball may be sufficient to overcome the restoring force of the lever and inadvertently actuate the warning light, even if there is no braking. Conversely, if the vehicle is ascending a steep hill, actuation of the brake pedal may be insufficient for the inertial forces to move the weighted ball and overcome the restoring forces of the lever, and possibly not actuate the warning light, even though there is a severe braking.

U.S. Pat. No. 6,424,256 to Ryder discloses a sensor and a flashing light signal for severe braking alert, including a conductive mass coupled for axial movement along a rod, a spring for resisting movement of the ball, and at least one pair of conductive wires which have their ends disposed at different locations along the rod. Upon severe braking, inertia forces drive the ball into contact with a wire end and an electrical circuit is completed therewith and the flashing light of a signaling device.

Such arrangements, systems, apparatus, and methods herein above described are, in general, believed to have been suitable for the specific purposes desired. However, some of the above-noted arrangements are complex, limited to and/or are specific to a particular application, or lack versatility.

An inertia actuated switching device, which is responsive to a sudden change in deceleration of a vehicle and is automatically initiated upon application of the vehicle brake, such as for instantly indicating a panic stop or for gradually increasing the amount of light emitted from its rear warning lights, and which overcomes the disadvantages of prior brake warning arrangements, would be desirable.

Today, many vehicles have wheel-speed sensors provided in anti-lock control systems (ABS), traction control systems, and/or vehicle stability control systems.

An automatic vehicle deceleration signaling apparatus, which can be connected into operable relation with such braking systems as original equipment, or installed into vehicles as an after market add-on by less skilled mechanics, would be desirable.

Further, a panic braking system which is inexpensive and relatively simple would be desirable.

It is thus an object of this invention to provide inertia driven brake signal light apparatus to a vehicle which is in addition to a standard brake signal light of the vehicle and operates to initiate a warning light, which inertia driven warning light in one embodiment is either "on" or "off" and is "on" only when indicating a severe or panic braking operation and in another embodiment is "on" and of increasing light intensity wherein to indicate a controlled braking operation.

SUMMARY OF THE INVENTION

The present invention is directed to a severe braking alert signaling apparatus for a vehicle of the type including a brake and a braking warning circuit for activating a first warning light, said signaling apparatus comprising an actuator plate including rearward and forward plate segments, said forward plate segment being of electrically conductive material, first spring means for interlocking the plate segments together along a common transverse pivot axis so as form a longitudinally extending actuator plate that has oppositely disposed rearward and forward ends, the spring means forming a resilient knee joint medially of the actuator plate that normally biases the forward plate segment away from the rearward plate segment but enables the plate segments to fold towards one another, at least in part, and the actuator plate to longitudinally compress, an electrical sensor for activating a second brake warning light upon application of said vehicle brake, said sensor in electrical circuit relation with said braking warning circuit, detent means for positioning the opposite ends of the actuator plate in first and second positions and the plate segments to open concavely upwardly, said forward plate segment being spaced from and in electrical circuit relation with said electrical sensor when the actuator plate is in said second position, second spring means for biasing the actuator plate in a direction transverse to the direction of travel of said vehicle and restoring said actuator plate into said first position, an inertial mass mounted atop said rearward plate segment for propelled movement upon severe braking from said rearward end towards said forward plate segment and in the direction of travel of said vehicle, the weight of said mass being greater than the biasing force of said second spring means, and propelled forward movement of said mass operating to cause the actuator plate to flex and the forward plate segment to move from the first position and into the second position and in electrical circuit relation with said electrical sensor, wherein to activate the second warning light, and a plunger switch in electrical connection with the braking warning circuit and including a plunger that is actuated only upon application of the vehicle brake, the plunger being movable between a normally extended position wherein to force the forward plate segment towards said first position and away from the electrical sensor and a retracted position upon application of the brake wherein to permit the forward plate segment to be biased away from said rearward plate segment and into engagement with the electrical sensor, corresponding to said second position.

According to this embodiment, the actuator plate may be one piece, or comprised of a pair of plates interconnected by a separately provided spring member. If one-piece construction, the plates are of electrically conductive material and the first spring means comprises a web of reduced material, the web forming a transition between the plate segments and being sufficiently resilient to force the plates away from one another. If separate components, the first spring means comprises at least one spring member that interlocks the two metal plates in such a manner that the plates are biased so as to swing away from one another and/or be folded back onto themselves.

Further and according to this embodiment, the inertia mass is a spherical ball. Alternatively, the inertial mass may comprise a cylindrical rod.

Further and according to this embodiment, there is provides an elongated generally rectangular frame, including respective upper and lower walls, opposed sidewalls, and rearward and forward endwalls. The detent means includes an abutment or stop on the lower wall for positioning the rearward end of the rearward plate relative to the frame, and a pair of abutments on the forward endwall for positioning the forward end of the forward plate, and the actuator plate, in the first and second positions.

Preferably, the first position is defined by the joint formed between the upper ends, respectively, of the upper wall and forward end wall. The second position is defined, at least in part, by an offset cavity formed in the forward end wall, the cavity being sized to receive the forward plate snapped therewithin. The forward end wall includes upper and lower wall portions and an offset wall which offsets the wall portions and cooperates to form the cavity.

When the actuator plate is lowered downwardly by the action of the inertial mass overcoming the upward force of the spring means and into the second position, the forward plate springs forwardly and into the cavity, against the lower wall portion, and against the sensor to complete an electrical circuit with the braking warning circuit, and the second warning light. The forward end of the forward plate is seated within the junction between the offset wall and the upward extension of the lower wall portion.

Upon ordinary braking, the inertial mass is not propelled forwardly and only the ordinary (first) warning light is activated. Upon severe braking, both the first and the second brake warning lights are activated.

Further and according to this invention there is provided a severe braking alert signaling apparatus for a vehicle of the type including a brake and a braking warning circuit for activating a first warning light, said signaling apparatus comprising:

a generally rectangular enclosure for attachment to stationary structure of said vehicle, said enclosure having an upper and a lower wall extending longitudinally, and a rearward and a forward end wall, the ends of the respective pairs of walls being joined to one another, said forward endwall being stepped to include offset upper and lower wall portions, an offset wall, the upper wall portion forming a first detent with said upper wall, and the lower wall portion forming a recessed cavity and a second detent with said offset wall, a resilient electrically conductive actuator plate and an inertial weight in said enclosure, said actuator plate including a rearward plate having a rearward end detained in said lower wall proximate to said rear end wall, a forward plate having a forward end disposed for sliding up and down movement against said forward end wall and detained in one and the other of said first and second detents, and a resilient spring for interlocking the plate segments together and forming a resilient knee joint medially of the actuator plate that normally biases the forward plate segment away from the rearward plate segment and towards said forward end wall, said actuator plate being upwardly concavely open and said rearward plate being at an acute angle to said lower wall, and said inertial weight comprising a sphere rollably mounted atop the rearward plate of said actuator plate for propelled movement from a rest position proximate to said rear end wall towards said forward plate following a severe braking deceleration, a coil spring for biasing said actuator plate away from said lower wall, a pair of electrodes in said recessed cavity for initiating a second brake warning light upon application of said vehicle brake, said electrodes projecting from the lower wall portion and in electrical circuit relation with said braking warning circuit and a power sources of the vehicle, and a plunger switch including a normally extended plunger for biasing the forward plate in a direction away from and outwardly of said recessed cavity and from electrical circuit relation with said electrodes, said plunger switch being in electrical circuit relation with the braking warning circuit and operable only upon application of the brake to retract the plunger, wherein upon severe braking the plunger retracts, the weight is propelled across the rearward plate, the actuator plate compresses the spring downwardly towards the lower wall, the forward plate slides downwardly relative to the forward end wall and into the cavity, the forward end of the forward plate seats in the second detent, and the forward plate seats in the cavity and completes an electrical connection with the second brake warning light, and further wherein following severe braking, the plunger switch is deactivated and the plunger is extended, forcing the forward plate outwardly of the cavity, the coil spring forces the actuator plate upwardly and the forward plate against the upper wall portion, and the forward end of the forward plate is forced into seated relation in the first detent.

In another preferred embodiment according to this invention there is provided a severe braking alert signaling apparatus for a vehicle of the type including a brake and a braking warning circuit for activating a first warning light, said signaling apparatus comprising:

mounting structure connected to a stationary part of said vehicle, said structure including vertically spaced upper and lower walls and longitudinally spaced rearward and forward end walls disposed vertically, said forward end wall facing in the direction of travel of said vehicle, and said upper wall including a generally rectangularly shaped longitudinal slot extending between first and second ends and having an axis extending in the direction of travel of the vehicle, a pivot shaft connected to said lower wall, an inertia driven pendulum having a central axis, said pendulum being adapted to swing between first and second positions and including a lower end portion fixedly connected to said pivot shaft, a medial portion movably disposed in said slot, and an upper end portion projecting outwardly of said enclosure and including an inertial mass, spring means connecting the pendulum to said mounting structure for biasing the medial portion of the pendulum against the first end of said slot and into said first position, said pendulum being adapted to swing away from said first position towards and into said second position and the central axis of said pendulum in said first position being disposed generally vertically, a pivot switch fixedly connected to said pivot shaft and in electrical circuit relation with a second brake warning light and a power source of said vehicle, pivoting of said pivot switch electrically interconnecting said second brake warning light with said power source and activating said second warning light, wherein severe braking of said vehicle causes said inertial mass to swing said pendulum away from the first end of said slot and the pivot switch to pivot and activate the second warning light, and wherein ordinary braking does not cause the pendulum to swing and only the first warning light is activated.

According to an aspect of this embodiment, the spring means comprises a helical coil spring, having one end connected to the mounting structure, and the other end connected to the pendulum arm, at a location between the upper wall of the mounting structure and the inertial mass. Preferably, the coil spring operates to apply a pulling force on the pendulum arm.

According to a further aspect, shock absorbing means is disposed at the first end of the slot, at the initial or rest position of the pendulum. The shock absorbing means cushions the medial portion of the slot when restored or biased thereagainst by the coil spring.

In another preferred embodiment according to this invention there is provided a controlled braking alert signaling apparatus for a vehicle of the type including a brake and a braking warning circuit for activating a first warning light, said signaling apparatus comprising:

mounting structure connected to a stationary part of said vehicle, said structure including vertically spaced upper and lower walls and longitudinally spaced rearward and forward end walls disposed vertically, said forward end wall facing in the direction of travel of said vehicle, and said upper wall including a generally rectangularly shaped longitudinal slot extending between first and second ends and having an axis extending in the direction of travel of the vehicle, a pivot shaft connected to said lower wall, an inertia driven pendulum having a central axis, said pendulum being adapted to swing between first and second positions and including a lower end portion fixedly connected to said pivot shaft, a medial portion movably disposed in said slot, and an upper end portion projecting outwardly of said enclosure and including an inertial mass, spring means connecting the pendulum to said mounting structure for biasing the medial portion of the pendulum against the first end of said slot and into said first position, said pendulum being adapted to swing away from said first position towards and into said second position and the central axis of said pendulum in said first position being disposed generally vertically, and sensor means for sensing and indicating the rate of deceleration of the vehicle, the sensor means comprising an electrical resistance element, a fixed electrical contact in electrical circuit relation to one end of said resistance element and to a second brake warning light, and a sliding contact in electrical circuit relation to the other end of said resistance element and to said braking warning circuitry, wherein following application of the brake and during deceleration of the vehicle, the normal or first light is activated, and the inertial mass causes the pendulum to pull away from a vertical relation and the sliding contact to slide across the resistance element and move closer to the fixed contact, the current and resistance in the circuitry operating to increase the current and thus the brilliance of the second warning light.

According to an important aspect of this embodiment, the sensor means comprises a rheostat.

Additionally, shock absorbing means are provided at the first end of the slot to cushion the pendulum arm when restored to the initial position.

Further, the spring means in the controlled deceleration embodiment is as above for the severe braking embodiment, and comprises a helical coil spring which applies a pulling force on the pendulum to restore the pendulum to the rest position.

The foregoing summary, as well as the following detailed description of preferred embodiments, will be better understood when read in conjunction with the accompanying drawings, wherein like numerals refer to like parts throughout. For illustrating the invention, there is shown in the drawings a preferred embodiment, it being understood, however, that the invention is not limited to the specific methods and instrumentalities disclosed. Other objects, features and advantages of the invention will become apparent in the following detailed description of the illustrative embodiments of the invention.

BRIEF DESCRIPTION OF THE DRAWINGS

FIG. 2 illustrates, in section, a severe braking alert signal indicating switch according to the present invention, the condition of the switch being shown prior to being triggered by a severe braking operation.

FIG. 3 illustrates, in section, the severe braking alert signal indicating switch shown in FIG. 2, the condition of the switch being shown when in a triggered state.

FIGS. 7-8 illustrate perspective views, partially in section, of a severe braking and a controlled deceleration sensing and indicating alert switch, according to the present invention.

DESCRIPTION OF PREFERRED
EMBODIMENTS OF THE INVENTION

Figure 1:
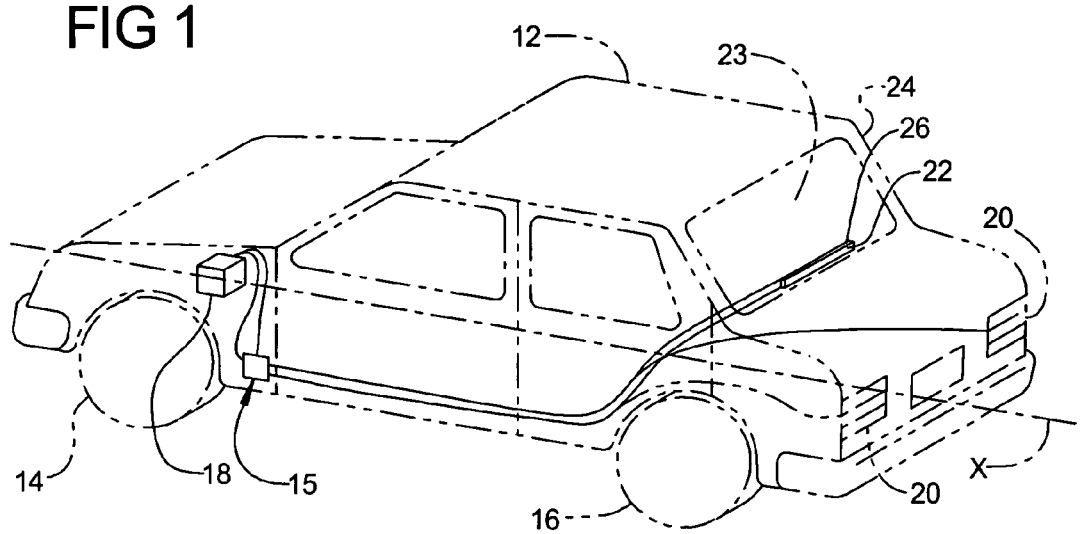
FIG. 1 is an illustration showing the installation on a conventional vehicle of a severe or panic braking alert signal indicating system according to the present invention.

Referring to FIG. 1, a conventional automobile vehicle 10 is shown, the vehicle including a chassis enclosed by a body 12, forward and rearward wheels 14 and 16, a passenger area, a braking system, and an electrical system 15. The braking system is operated by a brake pedal in the passenger area, which pedal is pressed down by the driver of the vehicle whereby to stop the rearward wheels 16 and arrest the forward motion of the vehicle. The electrical system 15 includes a power source, such as a battery 18, to provide electrical power to certain elements of the vehicle, such as the rear warning lights 20 and 22, and a braking warning circuit for activating the warning light 20. The brake pedal, braking system, warning circuit, and electrical system are not shown in detail as being conventional and known by those skilled in the art.

As shown, the rear warning lights 20 are provided at a lower outward area of the vehicle. The warning lights 20 are the normal brake indicating lights and actuated only upon application of pressure on the brake pedal.

The rear warning lights 22 are positioned in the interior passenger area 23 and in the center of the rear windshield 24. Due to their elevated position, the warning lights 22 are somewhat more visible to the driver in another car, approaching the vehicle 10 from behind.

Turning to FIGS. 2 and 3, the rear warning lights 22 are in addition to the normal brake warning lights 20 and are inertia actuated. In first and second embodiments according to this invention, as will be discussed hereinafter in greater detail, the rear warning lights 22 are inertia actuated (a) following a severe or panic breaking of the vehicle 10, or (b) during and as the result of a controlled but fairly rapid deceleration.

Preferably and in the first embodiment according to this invention, the vehicle 10 includes a severe braking alert signaling apparatus, generally indicated at 26, for sensing and measuring a rapid rate of deceleration experienced by the vehicle 10 and signaling this fact to persons outside of the vehicle. The signaling apparatus 26 is in electrical circuit relation with the battery 16 and operates only after the brake pedal has been applied in a severe panic stop and the vehicle is undergoing a rapid deceleration. That is, in a regular controlled stop initiated by the brake pedal, only the warning lights 20 will be actuated. In the panic, sudden and unexpected stop, both sets of warning lights 20 and 22 will be actuated.

The signaling apparatus 26 comprises a generally rectangular, longitudinally extending, box-like frame, enclosure or housing 28. The housing has opposed upper and lower walls 30 and 32 and a pair of opposed upstanding sidewalls (not shown) extending longitudinally, and opposed upstanding rearward and forward end walls 34 and 36. Preferably, the walls of the enclosure are of an electrically non-conductive material.

The upper and lower walls 30 and 32 extend between a respective of the upstanding rearward and forward end walls 34 and 36 and a respective of the upstanding sidewalls. The opposed walls 30 and 32, 34 and 36, and the sidewalls are in generally parallel relation to one another and joined together in right-angled joints.

The lower wall 32 forms a base and is adapted to be mounted on a stationary portion of the vehicle 10 and positioned horizontally. So mounted, the forward end wall 36 is disposed vertically and facing forwardly in the direction of movement of the vehicle.

Further, a vertically disposed abutment or shoulder 38 is provided on the interior surface of the base or lower wall 32. The abutment shoulder 38 extends between the sidewalls, defines a forwardly facing wall or detent, and is used for positioning purposes, as described hereinafter.

Although the abutment 38 is shown integrally formed with the wall 32 and as a lateral step extending thereacross, one or more upstanding stops bosses, and like elements could be attached atop an otherwise flat interior surface of the wall 32. Further, the abutment 38 could be in the form of a detent or recess in the lower wall 32.

The upstanding forward end wall 36 includes offset vertically disposed upper and lower wall portions 40 and 42 and a downwardly facing horizontally disposed abutment wall 41. The offset lower wall portion 42 and abutment wall 41 form a cavity or recess 44 in the upstanding forward end wall 36 which extends forwardly of the upper wall portion 40 and in the direction of vehicle motion.

Mounted within the housing 28 is a resilient dynamic reaction or actuating plate 46, an inertia driven mass or weight 48, and a coil spring 50. The actuating plate 46 is longitudinally extending, convex, and includes rearward and forward plates 52 and 54, wherein at least the forward plate 54 is of electrically conductive material. The plates 52 and 54 are interconnected with to one another in a manner that the two plates may flex, relative to one another and to their connection, and the actuating plate 46 may move up and down. The rearward plate 52 defines a ramp for the ball or weight 48 to travel forwardly on and the forward plate 54 defines an electrode plate that completes an electrical circuit between a pair of electrodes, connected to the rear warning lights 22 and the electrical system, in a manner to be described herein below.

The plates 52 and 54 are generally rectangular in shape and each includes, respectively, three edges which are free, including a pair of lateral edges and a longitudinal edge 58 and 60, the edges 58 and 60 of the plates 52 and 54 defining the opposite longitudinal ends of the actuating plate 46. The lateral edges are generally coextensive with the opposed sidewalls of the housing to assist in guiding up and down movement of the actuating plate 46 relative to the interior of the frame 28. The free edge 58 of the rearward plate 52 is adapted to be seated against the abutment shoulder 38, wherein to position the free edge 60 of the forward plate 54 for up and down sliding movement against the forward end wall 36.

So positioned, the upwardly open convex actuating plate 46 is adapted flex and to move up and down within the housing 28. The forward free edge 60 of the forward plate 54 engages the forward end wall 36 and slides or rides down and up against the upper wall portion 40. The actuating plate 46 is mounted such that the rearward plate 52 is at an acute angle to the base wall 32.

The forward plate 54 is generally juxtaposed against the upper wall portion 40, disposed generally vertically, and with the free edge 60 thereof nested within the intersection between the upper wall 30 and the upper wall portion 40. Depending on the lengths of the plates 52 and 54, the forward plate 54 may also be at an acute angle to the base wall 32.

The inertia driven mass or weight 48 is preferably in the form of a ball or sphere and is positioned in a normal rest position adjacent to the upstanding rearward end wall 34 and atop the rearward plate 52. Upon application of a panic brake, deceleration of the vehicle places a deceleration or propelling force on the ball 48, whereupon inertia causes the ball to roll from the rest position, across the rearward plate 52, and towards the forward end wall 36. Following the panic brake, the deceleration force is reduced and eliminated, whereupon the ball 48 will roll back towards the rearward end wall 34 and into the rest position.

Although the weight 48 is shown preferably as being a sphere or ball, the weight could also be in the form of a cylinder of circular cross-section. In such arrangement, the opposite ends of the cylinder are disposed against the opposite sidewalls of the housing, and the panic braking will cause the cylinder to roll atop the plate 52 and towards the forward end wall end wall 36.

The actuating plate 46 may be integrally formed or articulated. Critical to this invention is that a resilient knee or spring joint 62 connect the plates 52 and 54 together in a manner that allows flexing movement between the plates. That is, the knee joint 62 enables the plates 52 and 54 to fold towards one another as a result of a sudden or panic application of the brake pedal, but always biases the forward plate 54 towards and into engagement with one or the other of the upper and lower wall portions 40 and 42.

In one embodiment according to this invention, the actuating plate 46 is one-piece with a lateral medial portion thereof being properly dimensioned, or of a thinner cross-section, wherein to form a lateral web (not shown) and forward and rearward plate segments. The lateral web forms a resilient spring-like hinge element or knee joint element that enables the plate segments to flex toward and away from one another. The lateral web acts as a resilient spring that always biases the forward plate segment in a direction away from the rearward plate segment, and acts to restore the plate segments to their original position, should the segments undergo bending.

Figure 4:
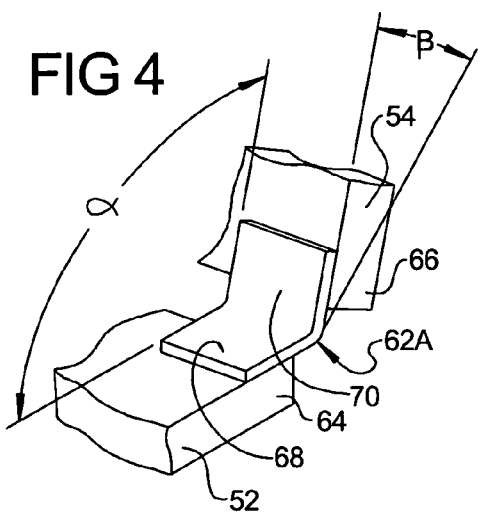
FIGS. 4-6 illustrate embodiments of a sensor actuating element according to this invention.
Figures 5, 6:
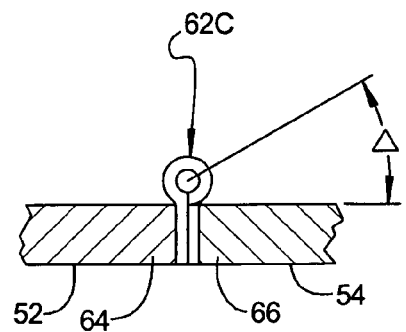

In another embodiment according to this invention, as shown in FIGS. 4-6, the resilient knee spring joint element comprises a separately provided resilient connecting component 62A, 62B, and 62C, which forms a hinge-like interconnection between the plates 52 and 54. The spring joint element 62A, 62B, and 62C resiliently connects respective longitudinal ends 64 and 66 of the plates 52 and 54 together and permits the forward plate 54 to be folded back towards to rearward plate 52 and biased away from the rearward plate 52.

According to one aspect of this embodiment, as shown in FIG. 4, the spring joint element 62 is in the form of an elongated hinge or leaf spring 62A of L-shaped cross-section and having generally rectangularly shaped first and second legs 68 and 70 disposed at an obtuse angle "α" to one another. The legs 68 and 70 are fixedly attached to and extend along, respectively, the end portions 64 and 66, respectively, of the rearward and forward plates 52 and 54. The material of the leaf spring 62A is sufficiently thin and configured so that the legs 68 and 70 may flex towards one another and bias the forward plate 54 towards and away from the rearward plate 52.

As illustrated, the leg 70 (and associated forward plate 54) and the leg 68 (and associated rearward plate 52) are shown folded towards one another and forming an obtuse angle "α" to one another (i.e., concave upwardly open). The L-shaped leaf spring or joint element 62A normally biases the legs 68 and 70 into an undeflected position, wherein the legs are at the angle "□" to one another.

The L-shaped leaf spring element 62A may be configured so that the legs 68 and 70 thereof extend completely across each respective end 64 and 66 of the plate segments 52 and 54. In some applications, depending on the resiliency desired, several laterally spaced L-shaped leaf springs 62A, of like or different width and spring constant, may be used.

Further, in some applications, the spring joint element 62 may comprise one or more separately provided spring clips. Illustrative are the spring interconnections 62B and 62C, shown in partial cross-section, in FIGS. 5 and 6.

FIG. 5 illustrates a plain hinge 62B of two leafs.

FIG. 6 illustrates a double half swaged spring 62C of two leafs.

The spring clips 62B and 62C are conventional and commercially available. In each, the spring clip is disposed between the mating edges 64 and 66 of the two plate segments 52 and 54 and operates to bias the forward plate segment 54 in a direction away from the rearward plate segment 52, and towards the forward end wall 36, as described hereinafter in greater detail. As shown, the plates 52 and 54 may originally be coplanar and the spring elements 62A and 62B operate to restore the plate segments into that condition.

The resilient coil spring 50 is disposed in the housing 28 with the lower end of the coil being supported on the base wall 32 and the upper end of the coil engaging a medial portion of the ramp or rearward plate 52. The coil spring 50 forces the actuating plate 46 upwardly and the resilient knee joint element 62 biases the forward plate 54 forwardly (i.e., away from the ramp 52) and against the upstanding forward wall 36 of the housing 28.

Importantly, weight of the ball 48 and the restoring force of the coil spring 50 are selected such that the coil spring will allow the rearward plate or ramp 52 to deflect downwardly when the ball 48 is inertially propelled or driven across the ramp, but sufficiently strong to force the actuating plate 46 upwardly and be restored to the original upwardly open concave position. The weight 48, spring joint 62, and the angles between the plates 52 and 54 of the actuating plate 46 are adjusted as needed to effectuate the operation of the warning light 22 upon application of the brake pedal, as well as the normal warning lights 20, during a panic braking.

A two-position plunger switch 72 and a pair of light actuating electrodes 74 are disposed in the lower wall portion 42 of the upstanding forward end wall 36. The plunger switch 72 is electrically operated and includes an axial plunger 76 having a force applying end 78. The plunger 76 is axially movable between extended and retracted positions and actuated by the user upon application of the brake pedal. Many devices are known in the art, and the plunger switch could comprise a solenoid actuator.

The plunger 76 normally extends axially outwardly from the lower wall portion 42 and into the cavity 44. Upon application of force to the brake pedal, an electrical signal is sent to the plunger switch 72 and to the normal brake lights 20, whereupon the plunger 76 is drawn towards the lower wall portion 42 and retracted into the plunger switch 72, and the normal brake lights 20 are illuminated. Upon release of the brake pedal, the electrical signal to the plunger switch 72 is terminated, whereupon the plunger 76 is driven (extended) outwardly and into the cavity 44 and the normal brake lights 20 are turned off Two light actuating electrodes 74 are in side-by-side relation and in electrical circuit relation, respectively, with a power source (i.e., the vehicle battery) and the rear warning light 22.

Initially, the actuating plate 46 is positioned in the housing 28 with the longitudinal edge 64 of the rearward plate 52 seated against the abutment 38 and the forward plate 54 positioned, at least in part, in sliding relation against the upper wall portion 40 and the force applying end 78 of the plunger 76. The forward end 60 is biased upwardly and nested in the intersection between the upper wall 30 and the upper wall portion 40. The plunger 76, being normally extended, prevents the forward plate 54 from entering into the cavity 44.

During normal or panic braking, the brake pedal cooperates to send a signal to the plunger switch 72, whereupon the plunger 76 is retracted and the normal brake lights 20 are illuminated. However, inertia forces do not propel the weight 48 across the plate 52 and the coil spring 50 forces the actuating plate 36 upwardly, with the electrically conductive forward plate 54 engaging the upper wall portion 40.

Further but during panic braking, and referring to FIG. 4, inertia propels the weight or ball 48 forwardly on the ramp or rearward plate 52. The weight of the ball 48 is sufficient to overcome the upward bias of the coil spring 50, whereupon the knee of the actuating plate 46 causes the plates 52 and 54 to simultaneously fold towards one another and the actuator plate to move downwardly. Importantly, the forward plate 54 slides downwardly across the upper wall portion 40 and into register with the recess 44 and the lower wall portion 42. The resilient knee spring connection 62 between the plates 52 and 54 biases the forward plate 54 towards the lower portion 42 and into contact with the electrodes 74, completing an electrical circuit connection between the power source 18 and the lights 22, wherein the panic stop emergency lights 22, as well as the normal lights 20, are illuminated. The forward plate 52 is detained within the cavity 44 with the upper edge 66 of the forward plate 54 abutted against the intersection between the offset wall 41 and the lower wall portion 42.

Upon release of the brake pedal, the electrical signal to the plunger switch 72 is terminated, whereupon the plunger 76 is driven outwardly and away from the lower wall portion 42. The free end of the plunger 78 engages and drives the forward plate 54 away from the electrodes 74, towards the rearward end wall 34, and outwardly of the cavity 44. Substantially simultaneously with the plate 54 being driven outwardly of the cavity 44, the coil spring 50 forces the actuating plate 46 upwardly and the forward plate 54 back into abutting relation against the upper wall portion 40.

The operational mode of the sensor system and the position of the sensor elements as a result of the user applying normal and panic forces on the brake pedal are summarized in the following table:

| Brake Mode | Sensor Plunger | Sensor Actuating Element | | Regular Brake Light | Panic Brake Light |
| | | Ball Ramp Position | Metal Plate Position | | |
| --- | --- | --- | --- | --- | --- |
| No Brake Brake Pedal Up | Extended | Ramp Up Ball in start position | Plate Up No electrode contact | Off | Off |
| Regular Brake (or Rides Brake) Brake Pedal Down | Retracted | Ramp Up No rapid inertia force, Ball stays in start position | Plate Up No electrode contact | On | Off |
| Panic Braking Brake Pedal Down | Retracted | Ramp Down Inertia forces Ball up Ramp towards Plate | Plate Down Contacts Electrode | On | On |
| After Panic Brake, Rides Brake Pedal Brake Pedal Down | Retracted | Ramp Down Inertia force removed, Ball free to roll | Plate Down Contacts Electrode | On | On |
| Removes Brake Brake Pedal Up | Extended | Ramp Up Ball returns to start position | Plate Up No electrode contact | Off | Off |

Turning to FIGS. 6 and 7, additional preferred embodiments of a braking alert signaling switch for a vehicle 10, according to this invention, are generally indicated at 100 and 200. As described above, the vehicle 10 includes a chassis 12 that extends in a first direction, wheels 14 and 16, a passenger area 23, a rear windshield 24, separately operated brake lights 20 and 22 at the rearward end of the vehicle, brakes for braking the vehicle, a brake pedal for actuating the vehicle brakes and the rear brake lights, a power source 18, a braking warning circuitry for activating the warning light 20, and electrical circuitry connecting the brake lights to the power source, braking warning circuitry, and the brake pedal.

The braking alert signaling switches 100 and 200 are mounted to a stationary portion of the vehicle chassis 12 and are inertia actuated deceleration sensing and indicating devices. The signaling switches 100 and 200 are in electrical circuit relation to the electrical circuitry of the vehicle and with the array of brake lights 22 in the passenger area of the vehicle, and viewable through the rear windshield of the vehicle.

The inertia actuated signaling switches 100 and 200 each comprise a mounting structure or frame 102, an elongated swing arm or pendulum, 104, a coil spring 106, and an electrical circuit signal device, respectively, such as a pivot switch 108 or a rheostat switch or system 208. As will be described hereinafter, the pivot switch 108 operates under a panic braking, and the rear warning lights 22 are either off or on, and the rheostat switch 208 operates under a controlled deceleration, and the rear warning lights 22 increase in illumination, depending on the severity of the braking or deceleration.

The mounting structure or frame 102 has horizontally disposed lower and upper walls 112 and 114, the upper wall 114 including a longitudinal guide slot 116, vertically disposed rearward and forward endwalls 118 and 120, and opposed vertical sidewalls 122 and 124. The guide slot 116 is generally rectangularly shaped and includes opposite endwalls 126 and 128. Preferably, the lower wall 112 is mounted to the stationary portion of the vehicle chassis. When mounted to the vehicle, the frame 102 is positioned such that the longitudinal axis of the guide slot 116 is aligned with the direction of travel of the vehicle and the forward endwall 120 of the frame 102 faces in the direction of travel of the vehicle.

The pendulum 104 is axially elongated and has lower and upper ends 130 and 132 and a medial portion 134 generally symmetrically disposed along a central geometric axis. The lower end 130 of the pendulum is pivotably connected to a pivot shaft 131 and connected to the frame 102 for rotation relative thereto. The medial portion 134 is constrained for alternating back and forth swinging movement in the guide slot 116. The upper end 132 projects upwardly and above the upper wall 114. As shown, the medial portion 134 is generally of squared cross-section and has surfaces that are complementary to the longitudinal sidewalls of the slot 116 for pendular movement therebetween.

An inertial mass or weight 136 is provided at the upper end 132 of the pendulum 104, and above the frame 102. Depending on the application, to permit adjustment in the inertial characteristics of the switch, the mass may be separately provided. As such, different masses could be used. Further, the mass 136 and pendulum arm 104 may be formed as a one-piece construction.

The elongated helical coil spring 106 has opposite ends 138 and 140, respectively, fixedly connected to a stationary frame member 142 and to the pendulum 104. Preferably and in the embodiment shown, the coil end 140 is fixedly connected to the pendulum arm 104 at a location proximate to the inertial mass 136 (i.e., between the guide slot 116 and the inertial mass 136). The coil spring 106 operates to normally pull the medial portion of the pendulum arm towards the frame member 142 and against the endwall 126 of the guide slot 116. So restrained, the longitudinal axis "A" of the pendulum 104 is positioned so as to be generally perpendicular to the horizontal plane of the vehicle chassis. The frame member 142 may be formed as part of the frame 102 or as an extension from the chassis. In some applications, the coil spring may be used to push the pendulum against the endwall 126 of the guide slot 116.

Further, energy absorbing material (not shown) is preferably at the endwall 126 of the guide slot 116. Such material will advantageously operate to cushion and prevent rebound of the pendulum arm when pulled thereagainst by the coil spring 106.

According to the panic braking arrangement, and referring to FIG. 6, the pivot switch 108 is fixedly connected, at least in part, to the sidewall 122 of the frame 102 and to the lower end 130 of the pendulum arm 104. Upon regular braking, only the warning lights 20 are activated. Further, upon severe braking, inertia forces cause the pendulum 104 to rotate relative to the slot 116 and to extend the coil spring 106. Rotation of the pendulum 104 causes the pivot switch 108 to pivot, wherein to establish an electrical circuit relationship between the power source 18 and brake warning circuit of the vehicle and the rear warning lights 22.

According to the controlled braking arrangement, and referring to FIG. 7, the rheostat switch 208 includes an arcuate resistance element 210 having opposite ends 212 and 214 representing high and low resistance ends of the resistance element 210, and two electrical contacts or terminals 216 and 218 which place the resistance element 210 in electrical circuit relation with the electrical circuit and power source 18 of the vehicle and the rear warning lights 22.

In the embodiment illustrated, the resistance element 210 is disposed on the vertical sidewall 124. The two contacts include a fixed contact 216, disposed on the sidewall 124 at the low resistance end 214 of the resistance element 210, and a sliding contact 218, disposed on the medial portion 134 of the pendulum 104. The sliding contact 218 is constrained to slide over the resistance element 210, following an arcuate path from the end 212 towards the end 214.

Electric current enters and leaves the resistance element 214 through the contacts 216 and 218. By sliding the contact pin 218 toward or away from the fixed contact 216, the length of the resistance element through which the current travels is increased or decreased. The increase or decrease brightens or dims the brake light 22, to which connected.

In each embodiment, whether using the pivot switch 108 or the rheostat switch 208, as a result of inertial forces, the pendulum is caused to rotate from a first position, wherein the pendulum is generally at true vertical, and a second position, wherein the pendulum arm is at an angle to true vertical.

The coil spring 106 maintains the pendulum arm in true vertical, or in the first position, and the inertial mass 136 vertically above the frame 102. Upon application of the brake pedal, the braking action places a deceleration or inertia force on the weight 136, causing the spring 106 to extend and the pendulum arm 104 to rotate away from the endwall 126 towards the endwall 128. Removal of the deceleration force allows the coil spring 106 to pull the weight 136 back into the rest position.

While the present invention has been described with respect to specific embodiments, it will be understood that from the foregoing detailed description and accompanying drawings that various modifications and variations will occur to those skilled in the art. Such modifications and variations are intended to fall within the scope of the appended claims.

What I claim is:

1. A severe braking alert signaling apparatus for a vehicle of the type including a brake and a braking warning circuit for activating a first warning light, said signaling apparatus comprising
   an actuator plate including rearward and forward plate segments, said forward plate segment being of electrically conductive material,
   first spring means for interlocking the plate segments together along a common transverse pivot axis and forming a resilient knee joint medially of the actuator plate that normally biases the forward plate segment away from the rearward plate segment but permits the plate segments to fold towards one another, at least in part, upon application of a closing force,
   an electrical sensor for activating a second brake warning light upon application of said vehicle brake, said sensor in electrical circuit relation with said braking warning circuit,
   detent means for positioning the actuator plate in first and second positions, said forward plate segment being spaced from and in electrical circuit relation with said electrical sensor, respectively, when the actuator plate is in said first and second positions,
   second spring means for biasing the actuator plate into said first position,
   an inertial mass mounted atop said rearward plate segment for propelled movement in a direction of travel of said vehicle, upon severe braking, from a rest position adjacent to the rearward end of said rearward plate segment towards said forward plate segment, a weight of said mass being greater than a biasing force of said second spring means and providing said closing force, wherein propelled forward movement of said mass operates to cause the actuator plate to fold, at least in part, and the forward plate segment to move from a first position and into a second position and establish electrical circuit relation with said electrical sensor wherein to activate a second warning light, and
   a plunger switch in electrical connection with the braking warning circuit and including a plunger that is actuated only upon application of the vehicle brake, the plunger being movable between a normally extended position wherein to force the forward plate segment towards said first position and away from the electrical sensor and a retracted position upon application of the brake wherein to permit the forward plate segment to be biased into said second position and engagement with the electrical sensor.

2. The severe braking alert signaling apparatus according to claim 1, wherein the actuator plate is one piece.

3. The severe braking alert signaling apparatus according to claim 1, wherein the second spring means acts on and applies an upward biasing force against the resilient knee joint medially of the actuator plate.

4. The severe braking alert signaling apparatus according to claim 2, wherein
   the plate segments are of electrically conductive material, and
   the first spring means comprises a web of reduced material, the web forming a transition between the plate segments and being sufficiently resilient to bias the plate segments away from one another.

5. The severe braking alert signaling apparatus according to claim 1, wherein
   the first spring means comprises a separately provided spring member, said separately provided spring member interlocking the two metal plates in such a manner to normally bias the plate segments away from one another but yield and allow the segments to be folded back onto themselves.

6. The severe braking alert signaling apparatus according to claim 1, wherein the inertial mass is a spherical ball.

7. The severe braking alert signaling apparatus according to claim 1, wherein the inertial mass is a cylindrical rod.

8. The severe braking alert signaling apparatus according to claim 1, further comprising
   an elongated generally rectangular frame, said frame including opposed horizontally extending upper and lower walls, opposed lateral sidewalls, and opposed vertically disposed rearward and forward endwalls, and further wherein
   said detent means includes an abutment on the lower wall for positioning the rearward end of the rearward plate relative to the frame, and a pair of vertically spaced abutments on the forward endwall for positioning the forward end of the forward plate segment, respectively, in said first and second positions.

9. The severe braking alert signaling apparatus according to claim 1, wherein
   said first position is defined by a corner joint formed by a junction between the forward end of the upper wall and the upper end of the forward end wall, and
   said second position is defined, at least in part, by a cavity formed in the forward end wall, the cavity being sized to receive the forward plate snapped therewithin.

10. The severe braking alert signaling apparatus according to claim 9, wherein
    the forward end wall is stepped and includes upper and lower wall portions, the lower wall portion being offset from the upper wall portion and forming the cavity for receiving the forward plate segment.

11. The severe braking alert signaling apparatus according to claim 10, wherein when the actuator plate is driven downwardly from the first position by the action of the inertial mass overcoming the upward force of the second spring means and into the second position,
    the forward plate segment springs forwardly and into the cavity, against the lower wall portion, and against the sensor to complete an electrical circuit with the braking warning circuit and the second warning light, and
    the forward end of the forward plate segment is seated within the offset between the upper and lower wall portions of the forward wall.

12. The severe braking alert signaling apparatus according to claim 1, wherein
    upon ordinary braking, the inertial mass is not propelled forwardly and only the first brake warning light is activated, and
    upon severe braking, both the first and the second brake warning lights are activated.

13. A severe braking alert signaling apparatus for a vehicle of the type including a brake and a braking warning circuit for activating a first warning light, said signaling apparatus comprising:

mounting structure connected to a stationary part of said vehicle, said structure including vertically spaced upper and lower walls and longitudinally spaced rearward and forward end walls disposed vertically, said forward end wall facing in a direction of travel of said vehicle, and said upper wall including a generally rectangularly shaped longitudinal slot extending between first and second ends and having an axis extending in the direction of travel of the vehicle, a pivot shaft connected to said lower wall, an inertia driven pendulum having a central axis, said pendulum being adapted to swing between first and second positions and including a lower end portion fixedly connected to said pivot shaft, a medial portion movably disposed in said slot, and an upper end portion projecting outwardly of said enclosure and including an inertial mass, spring means connecting the pendulum to said mounting structure for biasing the medial portion of the pendulum against the first end of said slot and into said first position, said pendulum being adapted to swing away from said first position towards and into said second position and the central axis of said pendulum in said first position being disposed generally vertically, a pivot switch fixedly connected to said pivot shaft and in electrical circuit relation with a second brake warning light and a power source of said vehicle, pivoting of said pivot switch electrically interconnecting said second brake warning light with said power source and activating said second warning light, wherein severe braking of said vehicle causes said inertial mass to swing said pendulum away from the first end of said slot and the pivot switch to pivot and activate the second warning light, and wherein ordinary braking does not cause the pendulum to swing and only the first warning light is activated.

14. A severe braking alert signaling apparatus for a vehicle according to claim 13, wherein the spring means comprises a helical coil spring for applying a pulling force on the pendulum arm, said coil spring having one end connected to the mounting structure, and an other end connected to the pendulum arm, at a location between the upper wall of the mounting structure and the inertial mass.

15. A severe braking alert signaling apparatus for a vehicle according to claim 13, further comprising shock absorbing means for cushioning the medial portion of the slot when restored or biased thereagainst by the coil spring, the shock absorbing means being disposed at the first end of the slot, at the initial or rest position of the pendulum.

16. A controlled braking alert signaling apparatus for a vehicle of the type including a brake and a braking warning circuit for activating a first warning light, said signaling apparatus comprising:

mounting structure connected to a stationary part of said vehicle, said structure including vertically spaced upper and lower walls and longitudinally spaced rearward and forward end walls disposed vertically, said forward end wall facing in a direction of travel of said vehicle, and said upper wall including a generally rectangularly shaped longitudinal slot extending between first and second ends and having an axis extending in the direction of travel of the vehicle, a pivot shaft connected to said lower wall, an inertia driven pendulum having a central axis, said pendulum being adapted to swing between first and second positions and including a lower end portion fixedly connected to said pivot shaft, a medial portion movably disposed in said slot, and an upper end portion projecting outwardly of said enclosure and including an inertial mass, spring means connecting the pendulum to said mounting structure for biasing the medial portion of the pendulum against the first end of said slot and into said first position, said pendulum being adapted to swing away from said first position towards and into said second position and the central axis of said pendulum in said first position being disposed generally vertically, and sensor means for sensing and indicating a rate of deceleration of the vehicle, the sensor means comprising an electrical resistance element, a fixed electrical contact in electrical circuit relation to one end of said resistance element and to a second brake warning light, and a sliding contact in electrical circuit relation to an other end of said resistance element and to said braking warning circuitry, wherein following application of the brake and during deceleration of the vehicle, a normal or first light is activated, and the inertial mass causes the pendulum to pull away from a vertical relation and the sliding contact to slide across the resistance element and move closer to the fixed contact, a current and resistance in the circuitry operating to increase the current and thus a brilliance of a second warning light.

17. A controlled braking alert signaling apparatus according to claim 16, wherein the sensor means comprises a rheostat.

18. A controlled braking alert signaling apparatus according to claim 16, wherein shock absorbing means are provided at the first end of the slot to cushion the pendulum arm when restored to an initial position.

19. A controlled braking alert signaling apparatus according to claim 16, wherein the spring means in the controlled deceleration embodiment is as above for the severe braking embodiment, and comprises a helical coil spring which applies a pulling force on the pendulum to restore the pendulum to a rest position.

\* \* \* \* \*